United States Patent [19]

Parker

[11] Patent Number: 5,806,373
[45] Date of Patent: Sep. 15, 1998

[54] GEAR AND METHOD FOR MANUFACTURING SAME

[75] Inventor: Norman E. Parker, Ft. Wayne, Ind.

[73] Assignee: Dana Corporation, Toledo, Ohio

[21] Appl. No.: 437,145

[22] Filed: May 5, 1995

[51] Int. Cl.[6] .................... F16H 55/00; B21D 53/28
[52] U.S. Cl. ................... 74/432; 29/893; 29/893.1
[58] Field of Search .................. 29/893, 893.1, 29/893.2, 893.34, 893.37; 74/423, 459.5, 446, 447, 432; 72/377; 148/573

[56] References Cited

U.S. PATENT DOCUMENTS

| | | | |
|---|---|---|---|
| 1,143,558 | 6/1915 | Templeton | 74/432 |
| 1,412,185 | 4/1922 | Leipert | 29/893.2 |
| 2,457,942 | 1/1949 | Van Zandt | 74/432 |
| 2,533,669 | 12/1950 | Hollingsworth | 74/432 |
| 2,932,207 | 4/1960 | Whitney | 74/447 |
| 3,248,782 | 5/1966 | Mooney | 29/159.2 |
| 3,577,795 | 5/1971 | Bennett | 29/893.2 |
| 3,626,779 | 12/1971 | Howard | 74/431 |
| 3,678,557 | 7/1972 | Howard | 29/159.2 |
| 4,059,214 | 11/1977 | Weissmann | 228/265 |
| 4,070,920 | 1/1978 | Le Blanc | 29/893.2 |
| 4,074,583 | 2/1978 | Hansson | 74/413 |

*Primary Examiner*—P. W. Echols
*Attorney, Agent, or Firm*—Oldham & Oldham Co., L.P.A.

[57] ABSTRACT

A method for manufacturing a gear, which may be utilized as a side gear in a vehicle differential, with the method including the steps of selecting a first billet of low carbon steel and producing an annular gear wheel therefrom, and selecting a second billet of low carbon steel and making an annular gear hub therefrom. The method further comprises the step of bonding the gear wheel to the gear hub. Both the producing and making steps may comprise the step of forging a gear wheel and gear hub, respectively, near net forming the hub and wheel, or net forming the hub and wheel. The step of joining may be accomplished by laser welding or alternatively, by applying adhesives to mating surfaces of the hub and wheel. Due to the use of separate billets of low carbon steel to produce or make the wheel and hub, the wheel and hub may be made of different materials.

31 Claims, 2 Drawing Sheets

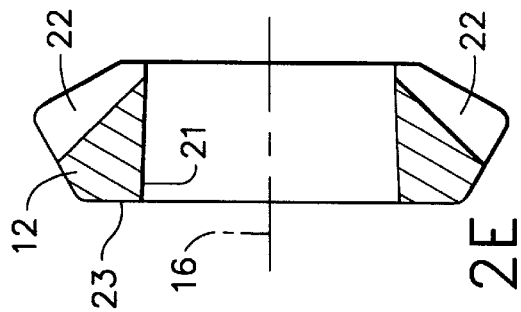
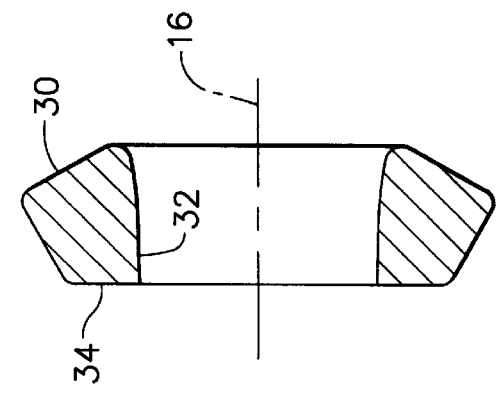
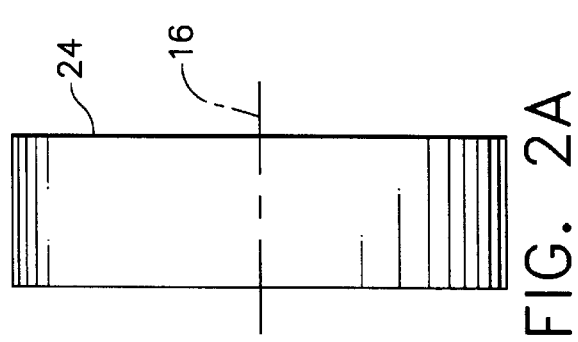
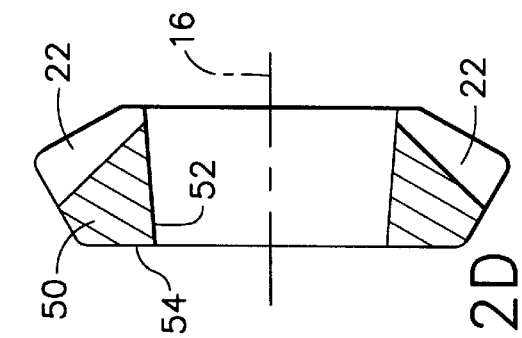
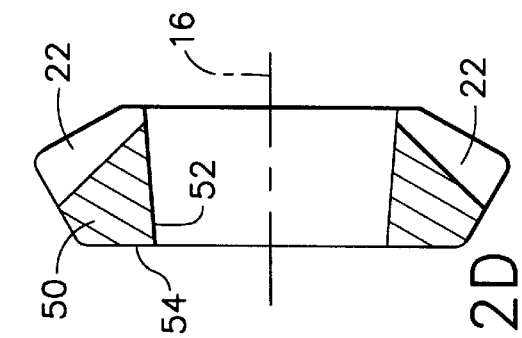
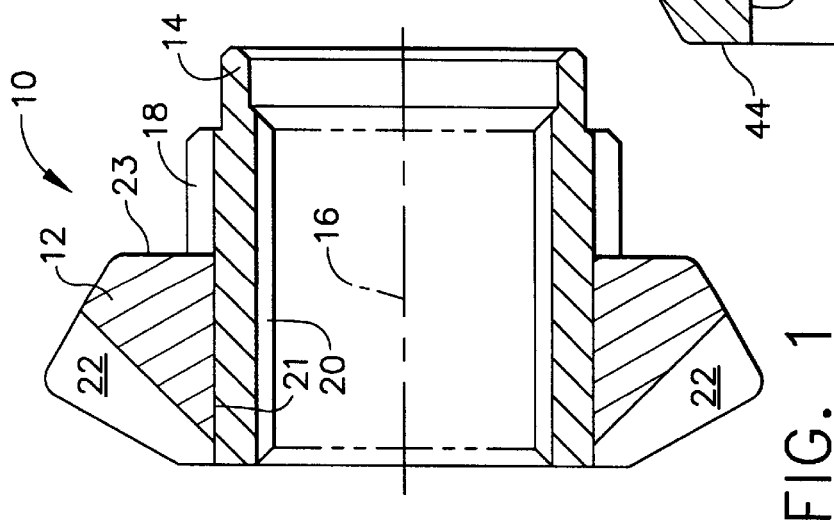

GEAR AND METHOD FOR MANUFACTURING SAME

BACKGROUND OF THE INVENTION

1.0 Field of the Invention

The present invention relates generally to a method for manufacturing gears and, more particularly, a method for manufacturing side gears adapted for use in vehicle differentials.

2.0 Related Art

Differential gear mechanisms, commonly referred to as differentials, are well known devices which are frequently used in drivetrains of most vehicles. Typically, the differential is contained within a case which is supported for rotation. A cross shaft is journalled in the opposed ends of the case for rotation therewith. A pair of pinion mate gears are supported on the cross shafts for rotation relative thereto. The pinion mate gears mesh with a pair of side gears having internal splines which are splined onto respective axle shafts extending out of the case. Thus, when the case is rotated, the pinion mate gears cause rotation of the side gears and, therefore, rotation of the axle shafts. As is well known, the pinion mate gears and the side gears do not rotate relative to one another when the vehicle is travelling in a straight line. However, when the vehicle is turning, the pinion mate gears and the side gears rotate relative to one another to permit the wheel on the outside of the turn to rotate faster than the wheel on the inside of the turn. The term "differential gears" will be used herein to refer interchangeably to these pinion mate gears and side gears.

Thus, it can be seen that differential gears do not rotate a significant amount relative to one another during normal operation, particularly for on-road vehicles. Rather, differential gears remain relatively stationary with respect to one another, since most vehicles are generally steered in a relatively straight line.

In situations where the wheels driven by the differential gears experience different ground conditions, it is possible for one wheel to slip while the other wheel on an axle continues to engage the ground without slipping. In such a situation, the differential gears will act to depower the non-slipping wheel, and rotate only the slipping wheel. Limited slip differentials are known which limit the depowering of the non-slipping wheel, so that the vehicle will retain driving traction even if one wheel is slipping. In a limited slip differential, the differential gears may be formed with external splines through which a slip-limiting apparatus may operate to drive the non-slipping wheel.

Limited slip differentials are popular for even on-road vehicles which rarely utilize the limited slip action of such differentials. For example, an automobile owner who operates a vehicle in areas having significant ice and snow during the winter may benefit occasionally from having the improved driving traction on icy surfaces afforded by a limited slip differential. Additionally, many vehicles having off-road capability may be driven the majority of the time on roads. Thus, even vehicles with limited slip differentials may be normally driven in relatively straight lines, with little relative rotation between the differential gears during normal operation.

Consequently, the primary mode of failure of differential side gear teeth is fracture caused by relatively brief impact stresses imposed thereon. Such impact stresses are encountered when large torques are applied to the differential by the vehicle engine, such as when the clutch of the vehicle is rapidly engaged or when the vehicle is rapidly accelerated. A primary mode of failure of external spines on a limited slip differential side gear is also fracture caused by relatively brief impact stresses. These stresses are imposed on the splines by the slip-limiting apparatus to limit the depowering of a non-slipping wheel.

Many different methods are known for manufacturing differential gears and similar gears adapted for other applications. Analyses of these methods have revealed that only a small portion of the total cost of manufacturing a gear is associated with the base material used to form the gear. Rather, the majority of the overall cost of manufacturing a gear is associated with the various steps involved in the manufacturing process. Accordingly, it is desirable that the process for manufacturing gears, particularly side gears adapted for use in differentials, be as efficient and cost effective as possible.

Previously, side gears for limited slip differentials have been formed by initially forging a billet of suitable material into a blank having the general shape of the finished part. Next, the blank is machined to form splines on the inner circumferential surface and on the outer circumferential surface of the hub extension. After machining, gear teeth are formed in the blank using a cutting apparatus. Then, the blank is case hardened by a conventional carburization heat treatment process. Finally, the thrust face is finish machined to complete the gear. Although this prior process has been adequate for manufacturing gears, it is inefficient for several reasons. First, specialized and expensive tooling is required to form the gear teeth and external splines in the hardened blank. Second, the formation of the teeth and external splines in the blank is a time consuming process. Third, the cutting process creates a large amount of waste material.

Accordingly, an improved gear manufacturing method which is more efficient and cost effective than prior methods is desirable.

SUMMARY

Accordingly, the present invention is directed to a method for manufacturing a gear. According to a preferred embodiment, the method comprises the steps of: selecting a first billet of a first wrought material and a second billet of a second wrought material; producing an annular gear wheel from the first billet of the first wrought material; making an annular gear hub from the second billet of the second wrought material; bonding the gear wheel to the gear hub.

Additionally, the present invention is directed to a gear made from the previously described method.

A main advantage of the method of the present invention is that different materials may be used to manufacture the hub and the wheel of a gear, thereby affording an opportunity to utilize high strength material in the highest stressed areas and lower cost, lower strength materials in the lower stressed areas of the gear.

BRIEF DESCRIPTION OF THE DRAWINGS

The aforementioned advantage, as well as other advantages, and the method steps and structural features and functions of the present invention will become more apparent from the subsequent detailed description of the preferred embodiments taken in conjunction with the accompanying drawings, wherein:

FIG. 1 illustrates a finished bevel side gear manufactured according to the method of the present invention;

FIGS. 2A–2E illustrate steps included in the method of the present invention concerning the manufacture of a gear wheel, according to alternative, preferred embodiments;

DETAILED DESCRIPTION

Figure 3B:
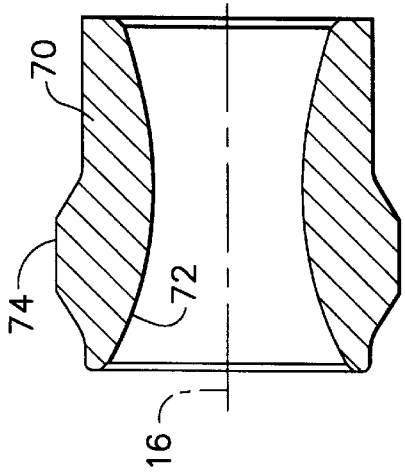
FIGS. 3A–3D illustrate steps included in the method of the present invention concerning the manufacture of a gear hub, according to alternative, preferred embodiments.
Figure 3D:
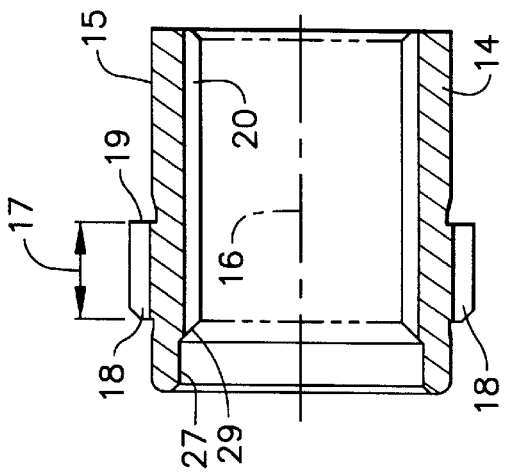
Figure 3A:
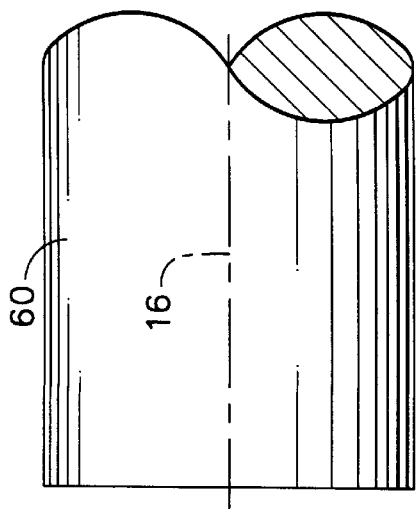

Referring now to the drawings, wherein like reference numerals have been used for similar elements throughout, FIG. 1 is a cross-sectional view illustrating a gear 10 comprising an annular gear wheel 12 and an annular gear hub 14 which are joined together as subsequently described. Both the gear wheel 12 and the gear hub 14 are coaxially disposed about a longitudinal centerline axis 16 of gear 10. Gear 10 preferably comprises a bevel side gear having application in a differential (not shown) of a motor vehicle. Bevel side gear 10 has particular application in a type of differential known as a limited-slip differential since gear 10 includes external splines 18 formed on gear hub 14 which may be used to engage the internal splines of annular drive discs (not shown) of the limited slip differential. Gear 10 further includes internal splines 20 which may be used to affix gear 10 to a rotatable member such as an output shaft (not shown) of a differential. Gear 10 further includes a plurality of gear teeth 22 formed in gear wheel 12 which meshingly engage the teeth of a mating gear (not shown) such as a pinion mate gear of a differential. Since gear wheel 12 and gear hub 14 are separately manufactured, wheel 12 and hub 14 may be made of different materials which affords the opportunity to utilize high strength material in the highest stressed areas of gear 10, such as teeth 22, and lower strength, lower cost material in lower stressed areas of gear 10 such as hub 14.

FIGS. 2A–2E will illustrate the inventive methods steps of the present invention with respect to producing, or manufacturing the annular gear wheel 12. First, a billet 24 of wrought material is selected, with the particular choice of wrought metal material dependent upon the required mechanical properties of gear 10. Examples of wrought materials which have been found to be acceptable for the manufacture of gear wheel 12, when gear 10 is to be used as a bevel side gear in a differential of a motor vehicle, are low carbon steels such as SAE 4615 or 9310. The inventor has also determined that 17CrNiMo6 is an acceptable material for billet 24. After selecting billet 24, the annular gear wheel 12 may be produced by any one of the following alternative, preferred methods. First, a forged annular gear wheel blank 30 may be produced from billet 24 or, alternatively, a net formed annular gear wheel blank 40 may be produced from billet 24. It is noted that gear wheel blanks 30 and 40 do not include gear teeth. With yet another alternative method, a net formed annular gear blank 50 may be produced from billet 24, wherein blank 50 includes gear teeth 22. Each of the gear blanks 30, 40, and 50 are coaxially disposed about centerline axis 16. Annular gear wheel 12, which is illustrated FIG. 2E, may be produced from any of the gear wheel blanks 30, 40, and 50. However, the particular method steps involved may vary depending upon the gear wheel blank used, as subsequently explained. Annular gear wheel 12 includes an inner, generally cylindrical bore 21 and an end surface, or thrust face 23. If gear wheel blank 30 is used to create gear wheel 12, the annular inner surface 32 of gear wheel blank 30 must be machined to create bore 21. Additionally, an end surface 34 of blank 30 must be machined to create a thrust face 23 of gear wheel 12 and blank 30 must also be machined, or cut to create gear teeth 22. If the net formed gear wheel blank 40 is used to create gear wheel 12, an inner surface 42 may or may not need to be machined to create bore 21. As known in the art, the concentricity between inner and outer surfaces of an annular member may be difficult to control within desired tolerances when forming operations are used and therefore, machining of surface 42 may be required to create bore 21. An end surface 44 of blank 40 must be machined to establish the thrust face 23 of gear wheel 12 and additionally, blank 40 must be machined or cut to create gear teeth 22. If the net formed gear wheel blank 50 is used to create, or produce gear wheel 12, it is possible that the only machining required is to machine an end surface 54 of blank 50 to create the thrust face 23 of gear wheel 12. However, as with the net formed blank 40, it may be necessary to machine an inner surface 52 of blank 50 to establish bore 21 of gear wheel 12. Since the teeth 22 are already formed on gear wheel blank 50, no additional machining is necessary, thereby resulting in a cost reduction relative to blanks 30 and 40. Since bore 21 and thrust face 23 comprise surfaces which interface with mating features of gear hub 14, it is necessary to produce, or prepare these surfaces with relatively small dimensional tolerances.

FIGS. 3A–3D illustrate alternative, preferred method steps included in making the annular gear hub 14. The first step is to select a billet 60 of wrought material which may be different than the wrought material of billet 24 since hub 14 typically experiences significantly lower stresses than wheel 12. More specifically, the external splines 18 and internal splines 20 of hub 14 typically experience lower stresses than the gear teeth 22 of wheel 12. The wrought material of hub 14 preferably comprises a low carbon steel such as SAE 4320, 8615, or 8620.

Figure 3C:
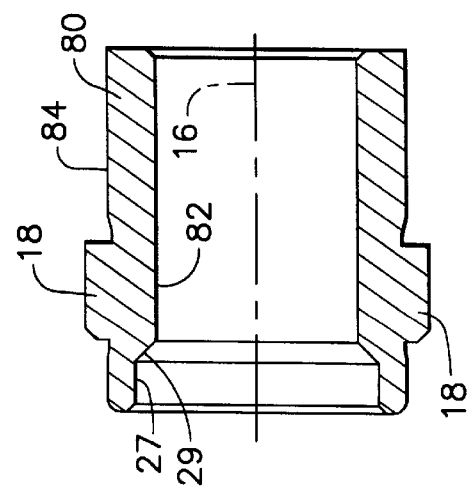

Alternatively, the material of billet 60 may comprise a plain carbon steel such as SAE 1526 or 1527. The next step in the inventive method of the present invention is to forge an annular gear hub blank 70 as illustrated in FIG. 3B, or alternatively, to net form an annular gear hub blank 80 as illustrated in FIG. 3C. Next, either blank 70 or blank 80 is used to produce the finished gear hub 14 illustrated in FIG. 3D. The included method steps differ, depending upon the use of either hub blank 70 or hub blank 80. If hub blank 70 is used to create hub 14, an inner surface 72 of hub blank 70 must be machined to create the internal splines 20 of hub 14. Additionally, surface 72 must be machined to create end bore 27 of hub 14 and a conical surface 29 transitioning between bore 27 and splines 20. Additionally, the external splines 18 must be created in an outer surface 74 of hub blank 70. Since hub 14 and wheel 12 are separately manufactured, conventional face hobbing may be used to create the external splines 18 from the outer surface 74 of hub blank 70. Face hobbing methods or techniques are not available with prior side gears having a wheel and hub made of a one-piece construction due to the close proximity of the external splines with the gear wheel. Due to the inventive method steps of the present invention, and an end surface 19 of splines 18 may be in abutting relationship with the thrust face 23 of gear wheel 12. In contrast, during the manufacture of prior one-piece side gears methods such as shaper cutting must be used to create the external splines on the gear hub and consequently a machining relief must exist between the external splines and the thrust face of the gear wheel. Accordingly, the longitudinal width 17 of external splines 18 is greater than the width of the external splines of prior one-piece gears. This advantageously permits the use of additional clutch plates or discs to be coupled with the external splines 18, thereby providing an increased torque capability of the corresponding differential (not shown) in which side gear 10 may be used. Additionally, the outer surface 74 of blank 70 must be machined to create a generally cylindrical surface 15 of hub 14 which mates with the inner bore, or generally cylindrical surface 21 of wheel 12, when wheel 12 and hub 14 are assembled to one another.

As shown in FIG. 3C, the net formed hub blank 80 includes the external splines 18 formed in an outer surface 84 of blank 80. Additionally, hub blank 80 includes end bore 27 and conical surface 29. However, an inner surface 82 of hub blank 80 must be machined to create the internal splines 20 of hub 14. Although hub blank 80 includes external splines 18, the splines 18 of blank 80 must be machined to create the end surface 19 of splines 18 which interface with, and are in abutting relationship with the thrust face 23 of gear wheel 12 when wheel 12 and hub 14 are joined to one another.

After gear wheel 12 and gear hub 14 have been separately manufactured, wheel 12 and hub 14 may be hardened by a suitable heat treat process and then bonded together, or alternatively, wheel 12 and hub 14 may be first bonded to one another and then heat treated. Wheel 12 and hub 14 are preferably joined to one another using a laser welding process which joins the inner, generally cylindrical surface 21 of wheel 12 to the outer, generally cylindrical surface 15 of hub 14, with the laser welding completed after positioning surface, or bore 21 over surface 15. Alternatively, wheel 12 may be bonded to hub 14, at the interface of surfaces 21 and 15, using a suitable adhesive having sufficient strength to carry the required torque load on gear 12.

The adhesive is used to join wheel 12 to hub 14 and is applied to at least one of the surfaces 21 and 15. Wheel 12 is then positioned over hub 14 so as to bond surfaces 21 and 15 to one another.

The method steps of the present invention permit the use of a relatively high strength material to manufacture the relatively high stressed gear wheel 12 and included teeth 22, while permitting the use of a lower strength, lower cost material to manufacture gear hub 14 and the included external splines 18 and internal splines 20 which are stressed to a relatively low level as compared to gear teeth 22. Additionally, the use of wrought materials for both gear wheel 12 and gear hub 14 provides higher strength materials as compared to the use of powdered sintered materials used to manufacture either the wheel or the hub of a gear. Additionally, the method steps of present invention permit the external splines 18 of hub 14 to be made using conventional face hobbing techniques, allowing width 17 of splines 18 to be greater than the splines of prior side gears and accordingly, increasing the torque carrying capability of the associated limited-slip differential additional clutch discs may be engaged with the external splines 18.

While the foregoing description has set forth the preferred embodiments in particular detail, it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

What is claimed is:

1. A method for manufacturing a gear having a longitudinal centerline axis and a central bore, said method comprising the steps of:

selecting a first billet of a low carbon steel and a second billet of a low carbon steel;

producing an annular gear wheel from said first billet of said low carbon steel material;

making an annular gear hub from said second billet of said low carbon steel material;

boning said gear wheel to said gear hub along mating cylindrical surfaces, said mating surfaces comprising an inner surface of said gear wheel and an outer surface of said gear hub;

said gear hub further including an inner surface defining said central bore.

2. The method as recited in claim 1, wherein the material of said first billet is different from the material of said second billet.

3. A method as recited in claim 2, wherein the material of the first billet is a higher strength material and the material of the second billet is a lower strength material.

4. The method as recited in claim 1, wherein said step of producing comprises the step of:

forging an annular gear wheel blank.

5. The method as recited in claim 4, wherein said step of producing further comprises the step of:

face hobbing gear teeth in said annular gear wheel blank about a periphery of said gear wheel blank.

6. The method as recited in claim 4, wherein said step of producing further comprises the step of:

machining gear teeth in said annular gear wheel blank about a periphery of said gear wheel blank.

7. The method as recited in claim 4, wherein said step of producing further comprises the step of machining an end surface of said gear wheel blank to create a thrust face on said gear wheel.

8. The method as recited in claim 1, wherein said step of producing comprises the step of:

net forming an annular gear wheel blank.

9. The method as recited in claim 8, wherein said step of producing further comprises the step of:

face hobbing said gear wheel blank to create a plurality of gear teeth spaced about a periphery of said gear wheel blank.

10. The method as recited in claim 8, wherein said step of producing further comprises the step of:

machining said gear wheel blank to create a plurality of gear teeth spaced about a periphery of said gear wheel blank.

11. The method as recited in claim 8, wherein said step of producing further comprises the step of machining an end surface of said gear wheel blank to create a thrust face on said gear wheel.

12. The method as recited in claim 1, wherein said step of producing comprises the step of:

net forming a gear wheel blank, said gear wheel blank including a plurality of gear teeth disposed about a periphery of said gear wheel blank.

13. The method as recited in claim 1, wherein said step of making comprises the step of:

forging an annular gear hub blank.

14. The method as recited in claim 13, wherein said step of making further comprises the step of:

machining internal splines in an inner surface of said gear hub blank.

15. The method as recited in claim 14, wherein said step of making further comprises the step of:

machining an end bore and a conical surface in said inner surface of said gear hub blank, wherein said conical surface transitions between said end bore and said internal splines.

16. The method as recited in claim 15, wherein said step of making further comprises the step of:

machining external splines in said gear hub blank.

17. The method as recited in claim 1, wherein said step of making comprises the step of:

net forming an annular gear hub blank which includes external splines.

18. The method as recited in claim 17, wherein said step of making further comprises the step of:

machining internal splines in an inner surface of said gear hub blank.

19. The method as recited in claim 1, wherein said step of bonding comprises the steps of:

positioning an inner, generally cylindrical surface of said gear wheel over an outer, generally cylindrical surface of said gear hub;

laser welding said gear wheel to said gear hub;

wherein said step of laser welding is completed after said step of positioning.

20. The method as recited in claim 1, wherein said step of bonding further comprises the steps of:

applying an adhesive to at least one of an outer, generally cylindrical surface of said gear hub and an inner, generally cylindrical surface of said gear wheel; and positioning said gear wheel over said gear hub to bond said gear wheel to said gear hub.

21. The method as recited in claim 1, further comprising the step of:

hardening said gear hub and said gear wheel; wherein said step of hardening comprises the step of heat treating said gear hub and said gear wheel;

said step of hardening is completed after said step of bonding.

22. The method as recited in claim 1, further comprising the step of:

hardening said gear hub and said gear wheel; wherein said step of hardening comprises the step of heat treating said gear hub and said gear wheel;

said step of hardening is completed before said step of bonding.

23. A gear made from the method according to claim 1.

24. A method as recited in claim 1, wherein said mating cylindrical surfaces are smooth circular surfaces.

25. A gear comprising:

a longitudinal centerline axis and a central bore;

an annular gear wheel disposed coaxially about said centerline axis and made from a first billet of a low carbon steel;

an annular gear hub disposed coaxially about said centerline axis and made from a second billet of a low carbon steel;

wherein said gear wheel is bonded to said gear hub along mating cylindrical surfaces, said mating surfaces comprising an inner surface of said gear wheel and an outer surface of said gear hub, said gear hub further including an inner surface defining said central bore.

26. The gear as recited in claim 25, wherein said gear wheel includes a plurality of gear teeth disposed about a periphery of said gear wheel.

27. The gear as recited in claim 25, wherein said gear hub includes a plurality of external splines and a plurality of internal splines.

28. A gear as recited in claim 27, wherein said gear has an annular thrust face, and end surfaces of said splines are in abutting relationship with said thrust face.

29. The gear as recited in claim 25, wherein said first billet is formed of a material which is different from the material of said second billet.

30. A gear as recited in claim 29, wherein the material of the first billet is a higher strength material and the material of the second billet is a lower strength material.

31. A gear as recited in claim 25, wherein said mating surfaces are smooth circular surfaces.

\* \* \* \* \*